United States Patent
Krishnan et al.

(10) Patent No.: US 8,284,057 B2
(45) Date of Patent: Oct. 9, 2012

(54) SECURITY TAG FOR OPTICAL MEDIA AND PROCESSES FOR FABRICATION AND ATTACHMENT

(75) Inventors: Kasiraman Krishnan, Clifton Park, NY (US); Matthew Jeremiah Misner, Delanson, NY (US); Kaustubh Ravindra Nagarkar, Clifton Park, NY (US); Tan Zhang, Niskayuna, NY (US); Owen Scott Quirion, Clifton Park, NY (US); James Enrico Sabatini, Scotia, NY (US); Michael Joseph O'Brien, Clifton Park, NY (US); Paul William Buckley, Scotia, NY (US); Marc Brian Wisnudel, Glen Rock, NJ (US)

(73) Assignee: NBCUniversal Media, LLC, Wilmington, DE (US)

( * ) Notice: Subject to any disclaimer, the term of this patent is extended or adjusted under 35 U.S.C. 154(b) by 869 days.

(21) Appl. No.: 12/344,615

(22) Filed: Dec. 29, 2008

(65) Prior Publication Data
US 2010/0073167 A1    Mar. 25, 2010

Related U.S. Application Data

(60) Provisional application No. 61/099,391, filed on Sep. 23, 2008.

(51) Int. Cl.
*G08B 13/14* (2006.01)
(52) U.S. Cl. .............. 340/572.1; 340/572.8; 340/568.1; 340/568.2
(58) Field of Classification Search .... 340/572.1–572.8, 340/568.1, 568.2, 568.8, 5.1
See application file for complete search history.

(56) References Cited

U.S. PATENT DOCUMENTS

| | | | |
|---|---|---|---|
| 4,374,001 A | 2/1983 | Bernier | |
| 4,444,626 A | 4/1984 | Bernier et al. | |
| 4,575,621 A * | 3/1986 | Dreifus | 235/380 |
| 5,141,622 A | 8/1992 | Fauteux et al. | |
| 5,491,262 A | 2/1996 | Hung | |
| 5,728,469 A * | 3/1998 | Mann et al. | 428/41.8 |
| 6,514,617 B1 | 2/2003 | Hubbard et al. | |
| 6,795,464 B2 | 9/2004 | Lawandy | |
| 7,042,359 B2 | 5/2006 | Clucas | |
| 7,127,066 B2 | 10/2006 | Solomon et al. | |

(Continued)

FOREIGN PATENT DOCUMENTS
WO    9840930    9/1998
(Continued)

OTHER PUBLICATIONS

O'Connor, "RF Activation Seeks to Turn Off Theft", RFID Journal, 2 pages, 2005.

(Continued)

*Primary Examiner* — Anh V La
(74) *Attorney, Agent, or Firm* — Fletcher Yoder

(57) ABSTRACT

An activation system for optical media in one embodiment includes a tag having at least one pair of conductors with at least one heating element coupled to the conductors. The heating element is oriented proximate one or more activation regions on the optical media, and wherein the heating element activates the optical media. The tag in one embodiment is an elongate flexible tag material with a number of conductors that couple on one end to heating elements wherein the heating elements are disposed within a media case such that they are proximate activation regions on a media article.

20 Claims, 9 Drawing Sheets

U.S. PATENT DOCUMENTS

| | | |
|---|---|---|
| 7,380,711 B2 | 6/2008 | Simon et al. |
| 7,614,024 B2 * | 11/2009 | Bothra .................. 716/119 |
| 2002/0163479 A1 | 11/2002 | Lin et al. |
| 2004/0022542 A1 | 2/2004 | Atkinson |
| 2004/0054594 A1 | 3/2004 | Forster et al. |
| 2005/0110978 A1 | 5/2005 | Potyrailo et al. |
| 2005/0167510 A1 | 8/2005 | Potyrailo et al. |
| 2006/0028924 A1 | 2/2006 | Atkinson |
| 2006/0234003 A1 | 10/2006 | Selinfreund |
| 2007/0007267 A1 * | 1/2007 | Rayl et al. ................. 219/217 |
| 2007/0070867 A1 | 3/2007 | Forster et al. |
| 2007/0114621 A1 * | 5/2007 | Wisnudel et al. ............ 257/414 |
| 2007/0116920 A1 | 5/2007 | Krishnan et al. |
| 2007/0116988 A1 | 5/2007 | Wisnudel et al. |
| 2007/0141293 A1 | 6/2007 | Wisnudel et al. |
| 2007/0231743 A1 | 10/2007 | Selinfreund et al. |
| 2007/0257768 A1 | 11/2007 | Bowers et al. |
| 2008/0018886 A1 | 1/2008 | Wisnudel et al. |
| 2008/0019258 A1 | 1/2008 | Peters et al. |
| 2009/0284374 A1 * | 11/2009 | Wisnudel et al. .......... 340/568.2 |

FOREIGN PATENT DOCUMENTS

| | | |
|---|---|---|
| WO | 2004095447 | 11/2004 |
| WO | WO2008036546 A2 | 3/2008 |
| WO | WO2008048747 A2 | 4/2008 |

OTHER PUBLICATIONS

Labarge, R., "DVD Authoring and Production", CMP Books; 2001, pp. 30-37, 198-221, 452-453. (36 pages).

Taylor, J., Johnson, M., Crawford, C.G., "DVD Demystified", 3rd Ed., McGraw-Hill; 2006, Chapter 7-1 to 7-30 and Chapter 9-1 to 9-33. (65 pages).

PCT International Search Report dated Oct. 5, 2009.

* cited by examiner

SECURITY TAG FOR OPTICAL MEDIA AND PROCESSES FOR FABRICATION AND ATTACHMENT

CROSS REFERENCE TO RELATED APPLICATIONS

This application claims the benefit of U.S. Provisional Application No. 61/099,391, filed Sep. 23, 2008, which is herein incorporated in its entirety by reference.

BACKGROUND OF THE INVENTION

Optical media devices, such as compact disks (CD) for audio data or music and digital video disks (DVDs) for video and/or audio information, provide an economical manner of storing various types of data information. Such optical media devices typically include the information in data layer that protected by a layer of optically transmissive or transparent material, wherein the information is read from the data layer of the device by an appropriate optical reader that is configured to transmit a beam of light through the transmissive material and to the data layer. The light reflected by the data layer is read by the reader that is able to extract the content data from the optical media.

The use of such optical media devices is popular for the distribution of digital movies and music as well as other types of digital products including software. These products are typically sold through retail outlet and stores. Due to the small size of the optical media and the high commercial value, such articles are popular targets for theft. For example, shoplifting at retail venues and especially for shopping malls is commonplace and it is estimated that the theft represents billions of dollars of lost revenue. Such losses are generally passed along as increased cost for the optical devices, which is borne by those that legitimately purchase the goods.

Many attempts have been made to deter such unwanted theft of these products. Certain products are equipped with theft-deterrent packaging with tags that set off an alarm if the item is removed from the store without being purchased. These tags are engineered to detect and alert for shoplifting.

Other theft-deterrent technologies used for optical discs include special hub caps for DVD packaging that lock down the DVD and prevent it from being removed from the packaging until the DVD is purchased. Similarly, "keepers" that are attached to the outside of the DVD packaging also prevent the opening of the packaging until the DVD is purchased. In some cases, retailers have resorted to storing merchandise in locked glass display cases. In other stores, the DVD cases on the shelves are empty, and the buyer receives the actual disc when the movie is purchased. Many of these approaches are unappealing in that they add an additional inconvenience to the buyer or storeowner or they are not as effective at preventing theft as desired. Furthermore, the optical media is completely functional even when misappropriated.

A further disadvantage of the conventional attempts of controlling the theft of optical media devices relates to the amount of time, expense and effort that is involved in first applying the anti-theft device to the packaging, and removing the anti-theft device from the packaging at the point of sale. Since many of these types of anti-theft devices are used over or recycled, the use of such devices creates a cycle of application, removal and reapplication that is time consuming and labor intensive, therefore costly for the retailer.

A still further disadvantage of the above-noted attempts of controlling the theft of optical media devices is that they typically require a large capital cost relating either to the devices themselves that are placed on the packaging, the devices that are used at the point of sale to remove or neutralize the anti-theft device, and/or the devices that are placed within the retail establishment usually near the doors to detect and signal an alarm when within the presence of the anti-theft device.

It is, therefore, desirable that an optical media device be constructed in a manner that provides anti-theft capabilities without many or all of the above-noted disadvantages, and without the reliance of product packaging as a method of providing such anti-theft characteristics. It is further desired that such an optical media device be constructed in such a manner that facilitates ease of use for a retailer in a reliable and inexpensive manner.

BRIEF DESCRIPTION

The system and methods described herein relate generally to Point-of-Sale (POS) activation of optical disc storage media, such as DVDs and Blu-ray discs, and provides a method of deterring shoplifting from retail stores.

One embodiment is an activation system for optical media packaged in a case, including a tag with at least one pair of conductors on the tag. There is at least one heating element coupled to the conductors, wherein the heating element is oriented proximate one or more activation regions on the optical media, and wherein the heating element activates the optical media. The tag in one aspect is a flexible elongate material with the heaters disposed on one end of the tag and conductors running along the length of the tag for engagement with some power source. In one example the tag is a pedestal that is coupled to the case.

By way of illustration of deployment, the tag can be attached to the optical media and then packaged in the case, or attached to the case and the optical media is then placed into the case. In one aspect the case further comprises case structures, wherein the case structures can be used to keep the tag in position within the case.

A further aspect of the system includes a power source that electrically couples with the conductors, wherein the power source in one example is a point of sale activation unit.

By way of example of operation of one example, the tag resides within the case and the optical media is placed into the case such that the pre-existing activation regions on the optical media are aligned above the heaters. For activation, the conductive traces engage a power source that causes the heaters to reach a set temperature range. The pre-existing activation regions are designed for a temperature within the set temperature range and the optical media becomes operable.

One embodiment of the activation tag for media articles comprises a flexible substantially elongate tag material with at least one pair of conductive traces running along at least a portion of the tag. There is at least one heating element disposed on the tag material, wherein the heating elements are electrically coupled to the conductive traces. The heating elements are disposed proximate one or more activation regions on the media articles such that during activation the heating element alters the activation regions and the media articles are activated. Typically the activation tags are integrated into a package or case and the optical media is placed into the case. The tag in one aspect further comprises a thermal interface disposed between the heating element and the activation regions.

One aspect of the tag includes a fuse portion coupled to at least one of the conductors. The fuse may serve the dual purpose of preventing the application of power such as in a series coupling and also as an identifier that can be used to identify that the tag was activated. The fuses may further include other identification aspects.

The heating element, for example, is at least one of a serpentine coil of a conductive material, a section of carbon ink, a section of nickel ink, or a section of copper deposited through a wet-etch process. The tag material, for example, is at least one of Polyethylene Terephthalate (PET), Polyimide, and paper. The tag material may also include an angled portion.

The tag in one aspect has at least one adhesive section proximate the heating element. This adhesive can be used to retain the alignment of the heating elements to the activation regions of the optical media. In one example the tag has a top surface and a lower surface with the media articles oriented facing the top surface and further comprising at least one adhesive section on the bottom surface.

One embodiment is a method of fabricating an activation tag for media articles, including forming a flexible substrate, providing at least one pair of conductive traces on the substrate, providing at least one heating element on the substrate, disposing an adhesive to at least a portion of the substrate, integrating at least one release layer to the adhesive, cutting the substrate, and removing a matrix portion. In one example, the method includes forming a roll of the activation tag, wherein the roll can be cut according to the usage requirements.

A further aspect includes providing a thermal interface material on or about the heating element. In a further aspect, the substrate has a top surface and a lower surface and further comprising a silicone coating on the lower surface. Additionally, a further aspect includes a release layer covering the adhesive on at least one of the top surface and the lower surface.

According to one embodiment, discs that are unplayable otherwise, would be made playable at the POS by the activation of sensor regions on the discs with the appropriate activation hardware. A tag is typically used within the package to activate the sensor regions, where in one example the sensor regions are thermochromic and change their color state with the application of heat. In one aspect, the heat is provided by printed electronic circuitry on the tag. The tag can have various components including conductors, resistors, thermal interface materials and adhesives, described by the various embodiments. The process for inclusion of the tag in the DVD package is simple to integrate into existing DVD packaging lines, and various embodiments for attaching the tag to the DVD are within the scope of the invention. Described embodiments identify various components that are part of the flexible tag, processes for depositing the layers, and conversion of sheets of tags into rolls of labels that are applied by standard label dispensers. Other embodiments describe various techniques for the integration of the tag in the DVD package.

In accordance with one embodiment, point-of-sale activation of optical media in retail stores rely on activating discs without opening the package, typically in less than two seconds duration. In order to do this, a flexible tag with printed electronic circuitry is included as a part of the DVD package. Various tag designs as well the processes for fabrication of the tag and for attaching the tag to the DVD are detailed herein.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

In order to improve upon the conventional point-of-sale activation techniques, General Electric Company has developed a number of systems and techniques. In one example, a dye chemistry is used to introduce dye-based activation regions on the optical media. In another example, a material capable of undergoing a morphological transformation is used such that the point of sale activation occurs through change of microstructure of the regions or through phase separation/mixing.

For illustrative purposes, one example, of an optical media point-of-sale activation technology comprises a mask layer placed over a data layer, and that includes chemical ingredients designed to render at least a portion of the data layer unreadable by an optical reader unless the data layer to be read is converted to an activated state.

In some embodiments, the media article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-Ray disc, a near field optical storage disc, a holographic storage medium, or another like volumetric optical storage medium, such as, for example, two-photon or multi-photon absorption storage format. As will be described in detail below, if the optical article is taken out of its packaging without being authorized, or if the optical article is attempted to be played without being authorized, the media will not allow at least a portion of the optical article to be readable.

In more particular detail, the optical media includes one or more sensor activation regions that are integrated as part of the media replication processing such that the media article is not usable until activated. The activation regions can be sensor spots of various shapes and sizes that occupy at least one or more portions of the optical media and possibly the entire media article.

Figure 1A:
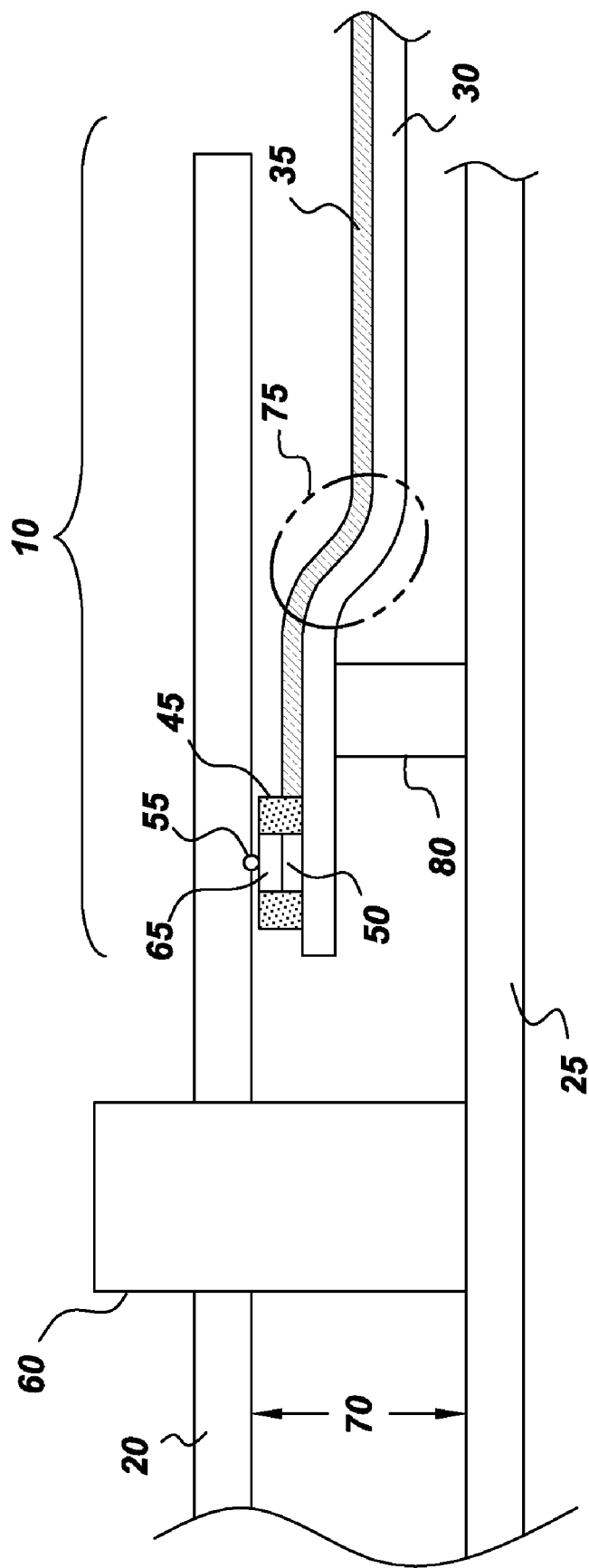
FIG. 1a shows tag structure with upper side adhesive according to one embodiment.

Referring to FIG. 1a, one deployed optical media tag system is depicted. In this embodiment, the tag structure 10 has various components coupling the media 20 and the case 25. The tag structure 10 in this embodiment includes a tag 30 with electrically conductive traces 35, and heating elements 50. Further features may include a thermal interface material 65 and top side adhesives 45, as described by various embodiments. The process for inclusion of the tag 10 in the package 25 allows integration with existing media packaging lines. One embodiment for attaching the tag to the media for point-of-sale activation of optical media in retail stores relies on activating discs without opening the package, typically in less than two seconds duration. In order to accomplish this objective, one example uses a flexible tag 30 with electrically conductive traces 35 having heating elements 50 is included as a part of the media package that can be electrically coupled to a power source (not shown). Further embodiments relate to various tag designs as well the processes for fabrication of the tag and for attaching the tag to the media article.

In operation according to one example, a tag 30 is positioned proximate sensor activation regions 55 on the media 20. The activation regions 55 in one aspect are thermochromic activation regions and change their color state with the application of heat. The heat in this example is provided by the application of an electrical charge to the heating element 50 on the tag 30, and various heating devices are within the scope of the invention. As illustrated, the heater 50 is disposed proximate the activation regions 55 and can held in place by the top side adhesive 45 coupling the tag structure 10 to the media 20. The heating element 50 in this example employs a thermal interface material 65 disposed about the heater 50 and disposed proximate the heater 50 and the activation regions 55. The thermal interface material 65 in this example has low resistivity and disperses the heat from the heater 50 and distributes it about the region of the activation regions 55. The thermal interface material 65 can also be used to fill any gaps when using the top side adhesive to match the heights and provide a planar portion for heating. For additional security, multiple activation regions 55 can be deployed and involve multiple heating elements 50. Furthermore, the activation regions 55 can involve materials requiring different temperature requirements such that the heating elements 50 can be matched with the particular activation regions 55.

The tag 30 in one aspect is made of a flexible plastic material. Examples of the tag material may include Polyethylene Terephthalate (PET), Polyimide, and paper. The tag 30 which can be a flexible or semi-flexible material can optionally include an angled portion 75 such that the approximately planar portion about the media are at a different level as compared to the opposing end that is closer to the case 25. There is generally a gap 70 between the media 20 and the case 25 wherein the media 20 is typically held in place within the case 25 by a center post 60. The tag 30 can be fabricated to include the angled portion 75 or have an approximate linear slope to the point of contact with the optical media 20. The case 25 can also include embedded case structures 80 such as ridges or posts can be fixed or free to aid in retaining the media 20 in the case 25 and facilitate the tag structure 10 deployment and/or the interaction with the optical media 20. The case structure 80 can be in various shapes and sizes to support the tag 10 structures and may also aid in alignment of the tag 30 to the activation regions 55.

In one embodiment conductive traces 35 are printed on the tag to provide the electrical connections to a power source. One embodiment for the conductive traces 35 includes disposing traces from ink that consists of conductive materials such as from silver precursor or nanoparticles. In another embodiment the traces 30 are made of copper, deposited through a wet-etch process. Other conductor types are known in the art and can be implemented with the tag design.

In one example, the activation stimulus includes resistive heaters 50. One example of a heating element is printed from carbon based or Nickel based inks. According to one aspect, the heating element provides sufficient heating to activate the media article such as heating to the range of about 110-160 Celsius for a time period of about 0.5-5 seconds and more specifically within about 2 seconds. The resistive properties in one example are about 5-100 ohms per square at 1 mil thickness, where a square is defined as the ratio of the length to the width of the trace. There are a number of heating elements known in the art that can be implemented with the tag embodiments.

In addition to the conductors and heating elements, there is a thermal interface material 65 disposed about the heater 50 in this embodiment. As shown in FIG. 1a, the adhesive 45 on the top side of the tag 30 is patterned such a way to cover the area around the heaters 50. In one example, the tag structure 10 can be coupled to the media 20 by the disc side adhesive 45 prior to installation into the case 25. The media 20 is typically held in place by a center post 60, which may or may not allow for rotation of the media article 20. The adhesive 45 in this example may be an adhesive that does not leave a residue.

Figure 1B:
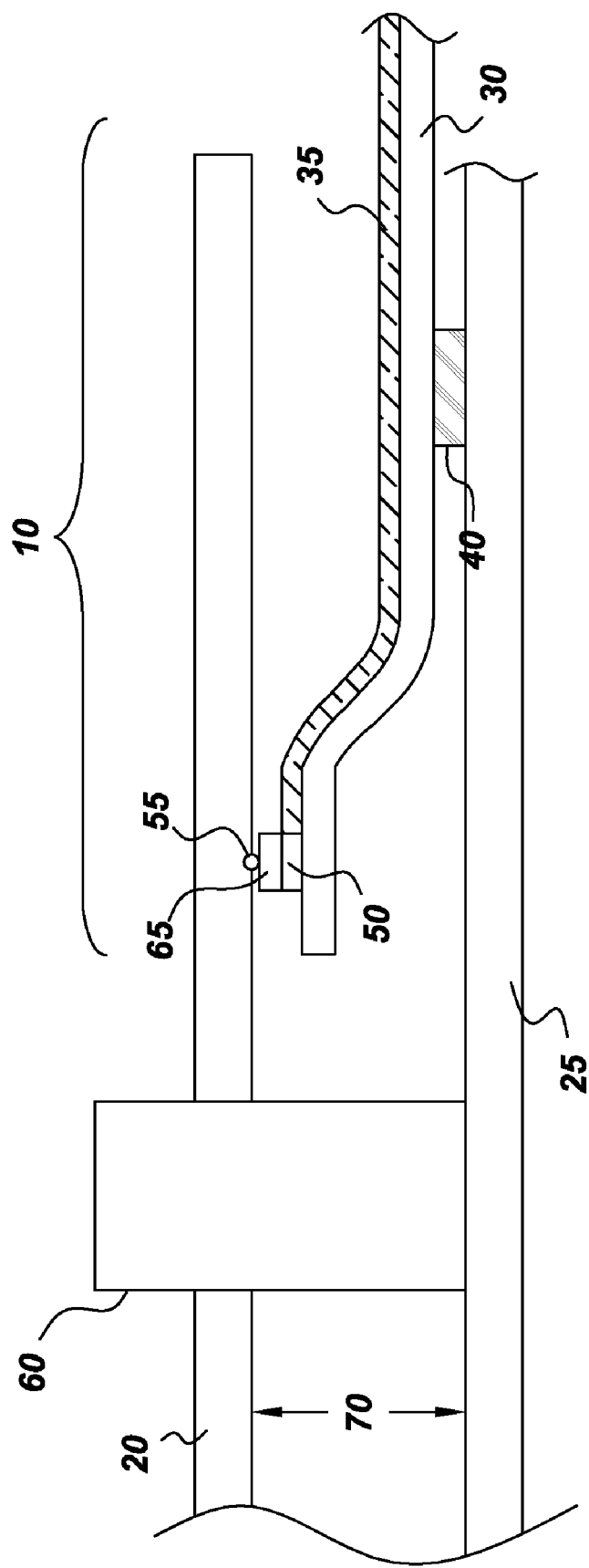
FIG. 1b shows tag structure with lower side according to one embodiment.

Referring to FIG. 1b, in this embodiment there is adhesive 40 on the bottom side of the tag 30 and positioned to attach the tag 30 to the case 25 and hold the tag structure 10 in position within the case 25. There is no top side adhesive, however the thermal interface material 65 is deployed about the heater and oriented proximate the activation regions 55. In one variation, the thermal interface material 65 has adhesive qualities and holds the tag structure 10 in proper orientation with the media 20.

In order to aid the contact of the heater with the activation region, the relative thicknesses of various layers on the top surface of the tag is established as design criteria. In one embodiment, the combined thickness of the heater and the thermal interface material (TIM) is larger than the thickness of the adhesive layer. This helps maintain proper contact between the heater and the activation regions. In another embodiment, there is no thermal interface and the heater thickness is larger than that of the adhesive. In yet another embodiment the adhesive itself serves the function of thermal interface, in which case there is no need for an additional thermal interface layer, and the adhesive can cover a wide area including the surface of the heaters. In another embodiment, there is an air gap between the heater and the spot, and the air gap is left as is without any gap filling thermal interface material, wherein the thermal conduction still occurs through the air layer.

In one aspect, the gap 70 between the media 20 and the case 25 is significantly larger than the thickness of the tag 30. In one example, the flexible nature of the tag device 10 as a whole enables the placement in the case 25 such that the media 20 is retained by the center post 60 and held in place by pressure applied from the tag 10.

In a further configuration, the under side adhesives 40 is applied to secure the tag 30 in place within the case 25 and in proper orientation to the activation regions 55. Thus, the under side adhesive adhesives 40 help to prevent the media 20 from rotating during shipping and handling, thereby minimizing the risks of tag-spot misalignment. In one embodiment the top side adhesive 45 from FIG. 1a can be deployed with the under side adhesive 40 to aid in holding the tag structure 10 in place.

Figure 1C:
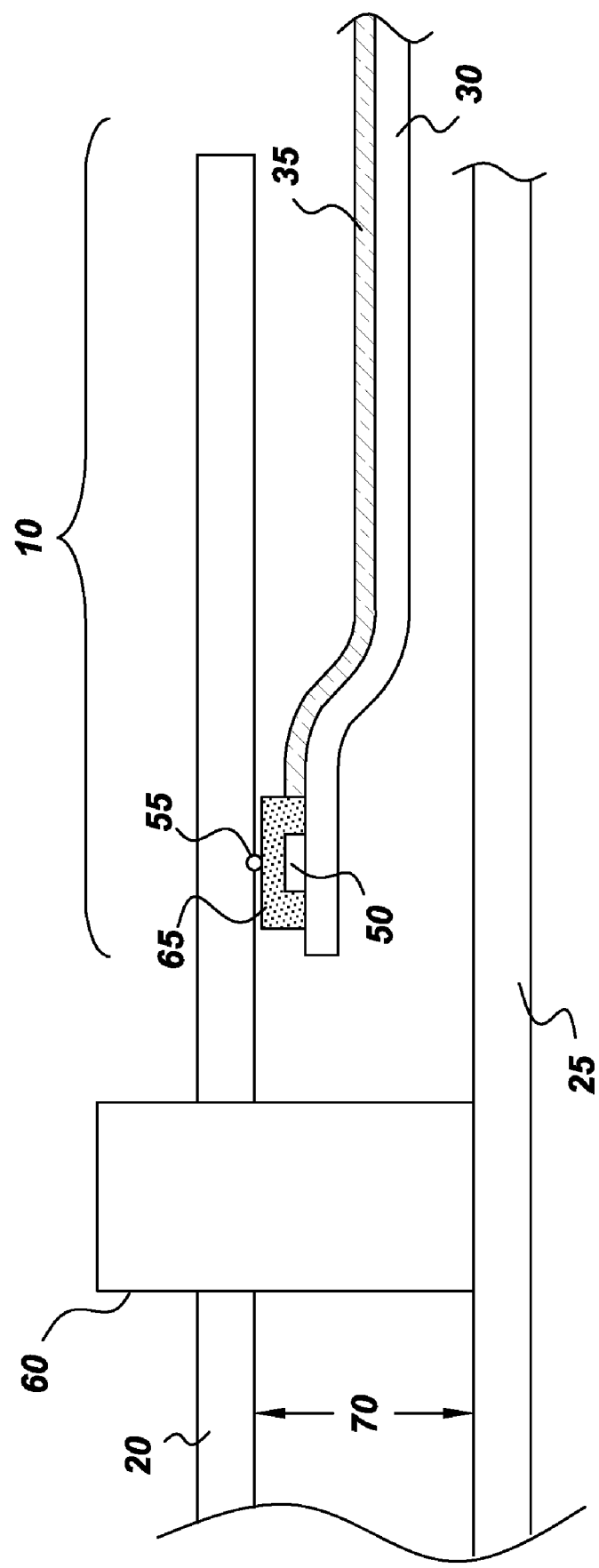
FIG. 1c shows tag structure with thermal interface adhesive according to one embodiment.

In FIG. 1c, a further configuration of the tag structure 10 shows that the thermal interface material 65 has adhesive qualities and typically leaves no residue on the media 20. There is no under side adhesive and the tag can reside loosely within the case or be deployed with the case structures 80 from FIG. 1a.

Figure 1D:
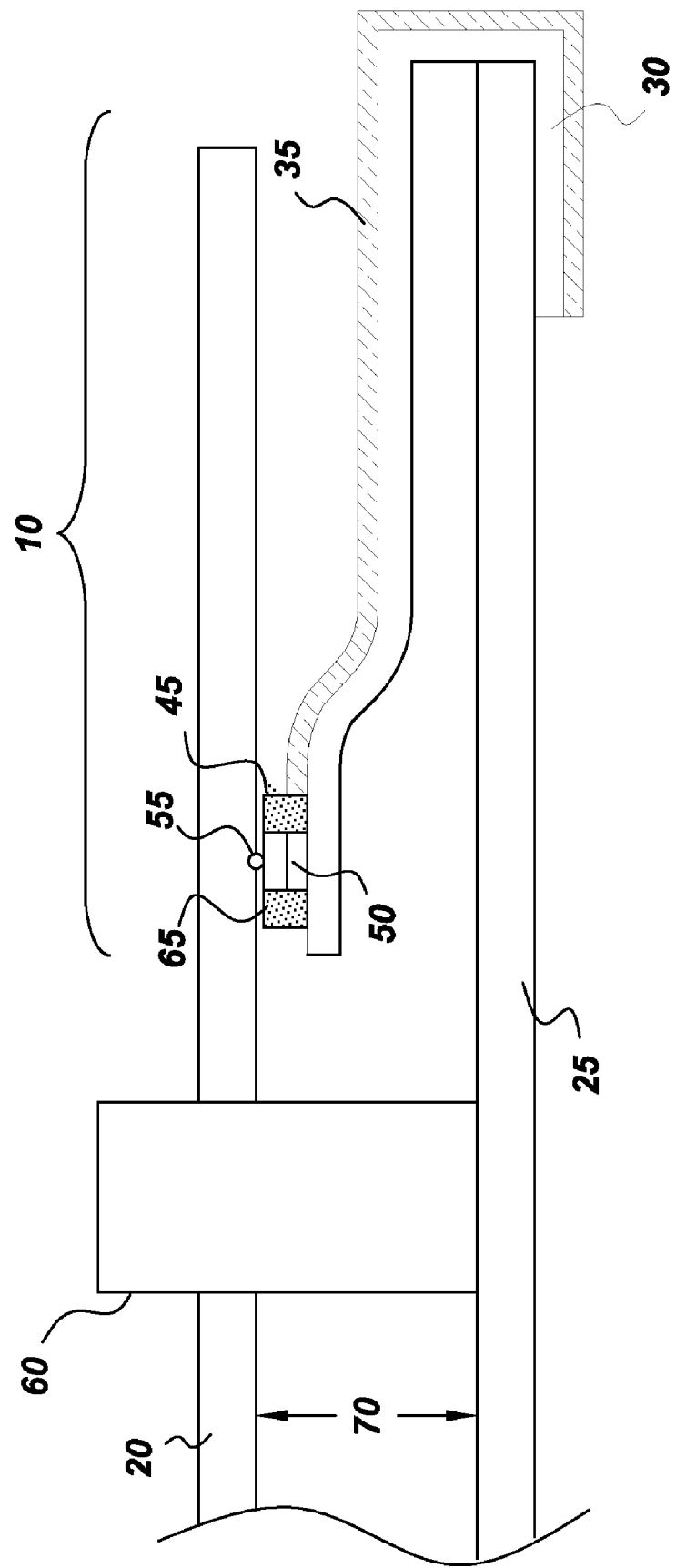
FIG. 1d shows tag structure wrapped around case according to one embodiment.

FIG. 1d shows one embodiment for wrapping the flexible tag 30 about the exterior of the case 25 such that a portion of the tag 30 is positioned about the exterior after packaging. In one POS activation configuration, there are pins that reside in an activation unit (not shown) such that the activation unit pins contact the conductors 35 and provide the power for activation. The activation unit can electrically couple to the conductors 35 on the exterior surface of the case 25 such as indicated by the tag 30 that extends about a portion of the exterior of the case.

Figure 1E:
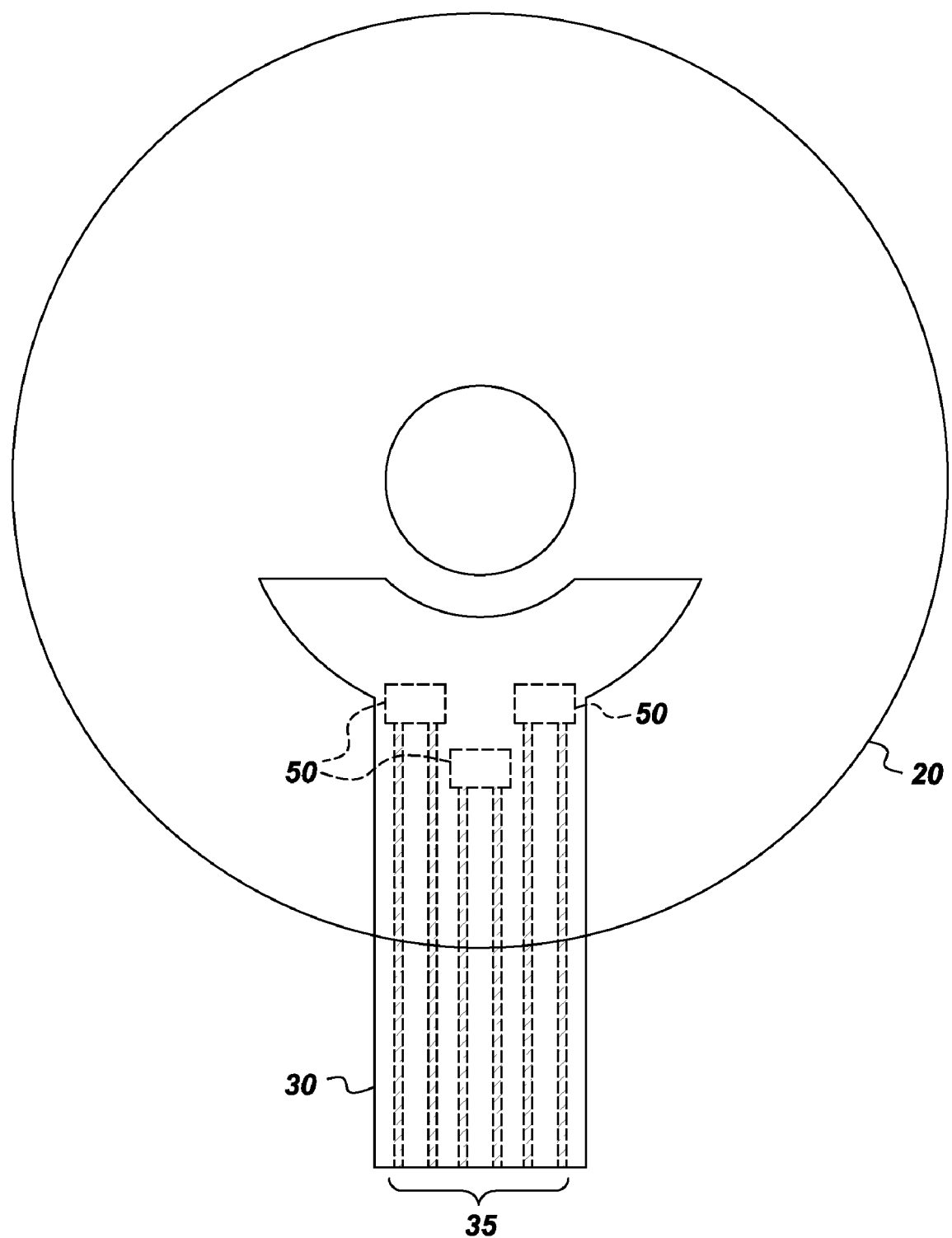
FIG. 1e shows a bottom view tag structure coupled to the media according to one embodiment.

Referring to FIG. 1e, a bottom view perspective according to one embodiment is shown with the tag 30 coupled to the underside or data side of the media 20. In order to show the features, the phantom view shows the heater sections 50 that heat the activation regions on the media and the conductive traces 35 that lead to a location that can provide an energy source. The width of the tag in this embodiment is sufficient to allow for multiple conductors and heaters.

Figure 2A:
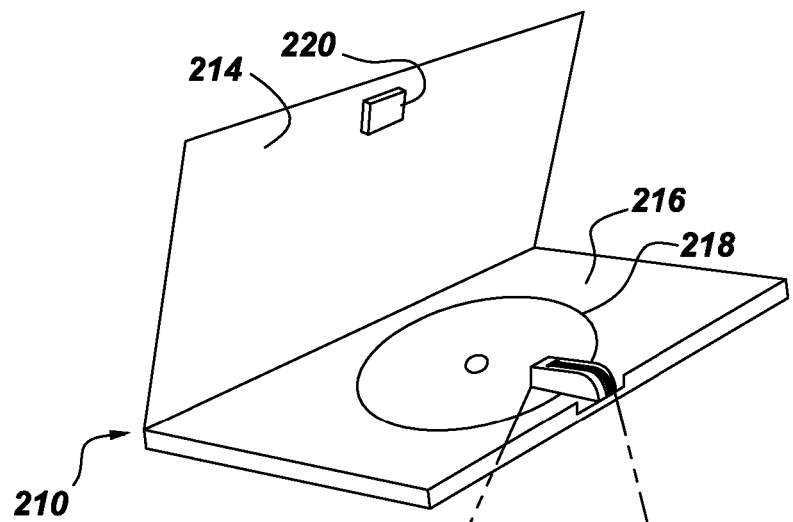
FIG. 2a illustrates an actual DVD case with a pedestal embedded in the case according to one embodiment.

In another embodiment, as shown in FIG. 2a, a package 210 for optical media articles is typically made of plastic and includes a cover portion 214 and a base portion 216 that is generally hingedly coupled. The package 210 typically includes some form of nest 218 wherein the optical media would reside. In one aspect, the package 210 includes a protrusion 220 located on the cover 214, wherein the nest 218 and the protrusion 220 help to retain the media article in place.

Figure 2B:
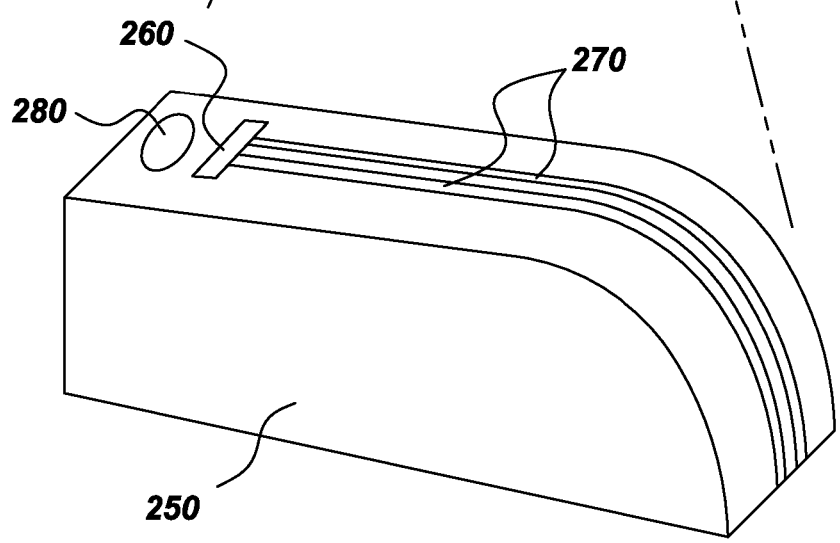
FIG. 2b shows a perspective illustration of the pedestal in accordance with one embodiment.

Referring to FIGS. 2a and 2b, one embodiment is a tag device that is integrated as a "pedestal" 250 that can be molded with the case 210 or made separately and later coupled to the case such as a snap-in feature. The heater 260 and conductive traces 270 can be separately applied to the pedestal 250 or integrated with the pedestal. In one aspect, the combined thickness of the tag pedestal 250 approximately matches the width of the gap between the media and the cover 214 such that the media (not shown) is held in place and properly oriented so that the heater 260 is aligned with the activation regions on the media article. In one embodiment a top side adhesive 280 on the pedestal tag 250 ensures the alignment between the spot region of the media and the heater 260.

Figure 3:
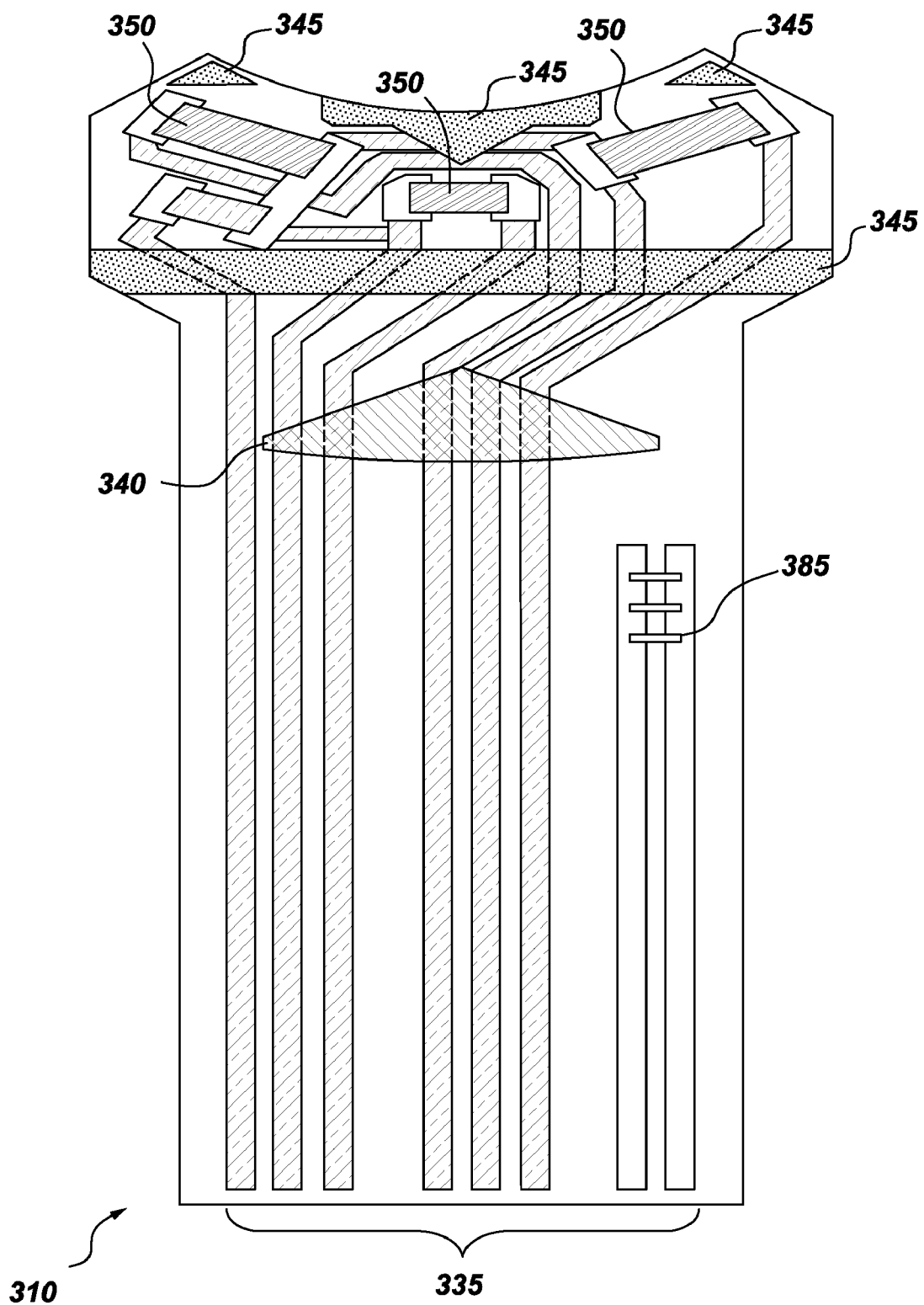
FIG. 3 depicts an open side view perspective of the adhesive layout on the top and bottom sides of the tag.

Referring to FIG. 3, one embodiment of the tag 310 is a flexible elongated member that includes disc adhesive sections 345 as well as case side adhesive sections 340. There are a number of conductive traces 335 that extend along a length of the tag 310 to the respective heaters 350. In one aspect, a fuse or switch 385 is included in the tag such that during the activation process the fuse or switch 385 is opened thus signifying that the activation is complete. Further attempts to activate the tag 310 could be prevented, as the system processing would check the fuse or switch 385 prior to exercising the activation process. An 'open' would signify that the activation process is complete. There are various types of fuses or switches that can be deployed with varied design criteria that dictate the conditions for which the fuse would be blown. It should be noted that the conductive traces 335 can be for individual heating elements 350 or the heating elements 350 can be coupled in series and not require individual conductors. So, for example, a series coupling could conduct sufficient current for the heating elements to reach the desired range and the fuse would open thereby preventing any further power application. One advantage of individual conductors for the heating elements is that the heating elements are individually controlled such that the heaters 350 can provide different heating requirements for different activation regions and/or redundancy.

In one embodiment, there is no adhesive layer 345 on the disc side of the tag 310, and contact is made between the activation regions and the heaters 350 by pressing the media against the tag either by pinching the case during the activation process or by including an insert such as a pedestal inside the case that would provide pressure from the tag against the media when the case is closed.

In another embodiment, the case side of the tag does not have an adhesive layer. Instead the adhesive would be dispensed on the case for attaching the tag. For example a "fugitive adhesive" such as glue dots is dispensed on the case during media packaging, before tag attachment.

Figure 4:
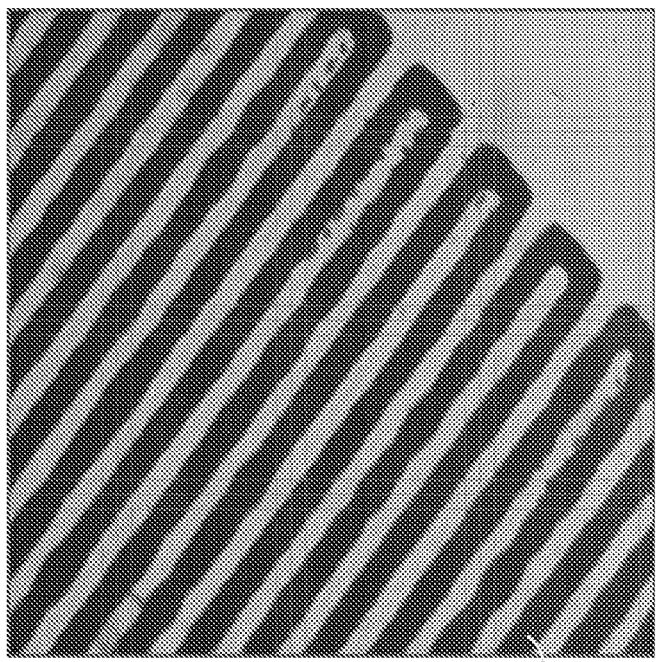
FIG. 4 shows the coil-type heater configuration according to one embodiment.

In one embodiment, the heating element is in the form a serpentine pattern 400 with an overall 40-60% open space between the traces. A schematic of this heater embodiment is shown in FIG. 4, and in one example the serpentine pattern 400 is made of a conductive material such as silver. The fine pitch of the serpentine pattern 400 provides sufficient heat for the activation.

Figure 5:
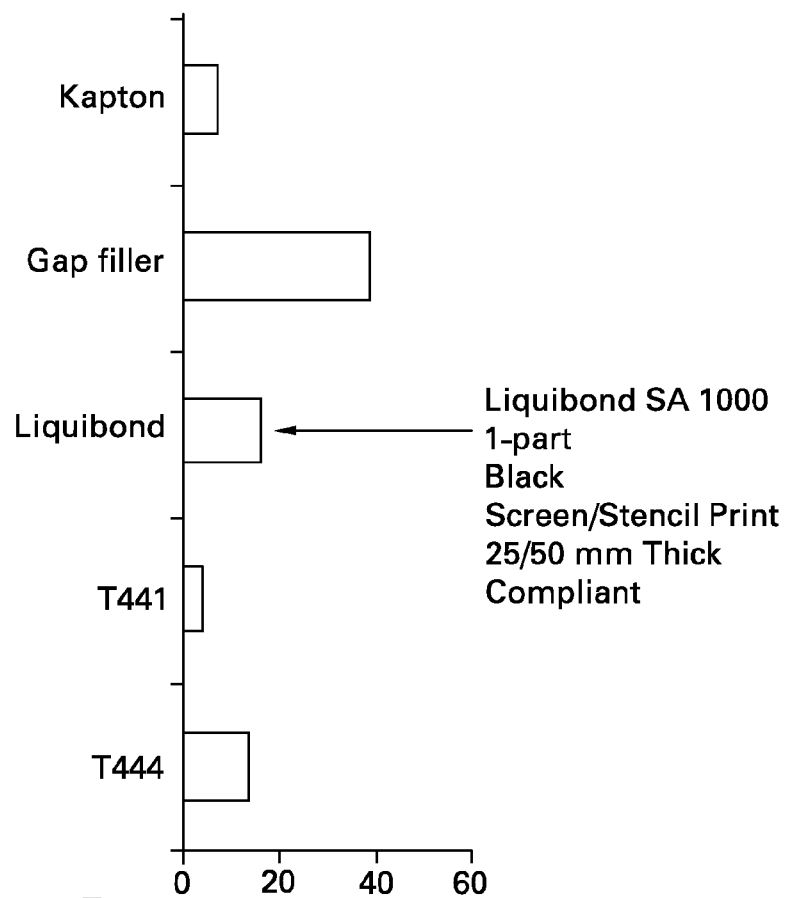
FIG. 5 depicts a graph of the thermal interface material screening.

Referring to FIG. 5, the thermal interface properties for various materials is shown along with their respective reflectivity percentage. The thermal interface materials reflect materials that may serve the dual function of adhesion and thermal interface. One of the basic requirements for the thermal interface is that it has physical integration and shelf life, and also does not lead to significant heat loss. FIG. 5 shows the data from screening of various thermal interface materials. The optical reflectivity of activation regions on the media was measured at 650 nm, wherein the reflectivity percentage change of an activation region on the media is shown after being activated by heat that was transferred from the heating element on the tag through various thermal interface materials to the activation regions. Some of the illustrated thermal interface materials include Polyimide, low-modulus two-part elastomer thermal adhesive (such as Gap Filler 1000), one-part silicon thermal interface adhesive (such as Liquibond® SA1000), Aluminum oxide filled silicone thermal interface pads (such as Cho-therm® T441), and Aluminum Oxide filled Acrylic thermal interface pads (such as Cho-therm® T444). For example, Liquibond® SA1000, a low viscosity one-part silicone adhesive, can be screen or stencil printing with a thickness of 25-50 µm.

Figure 6:
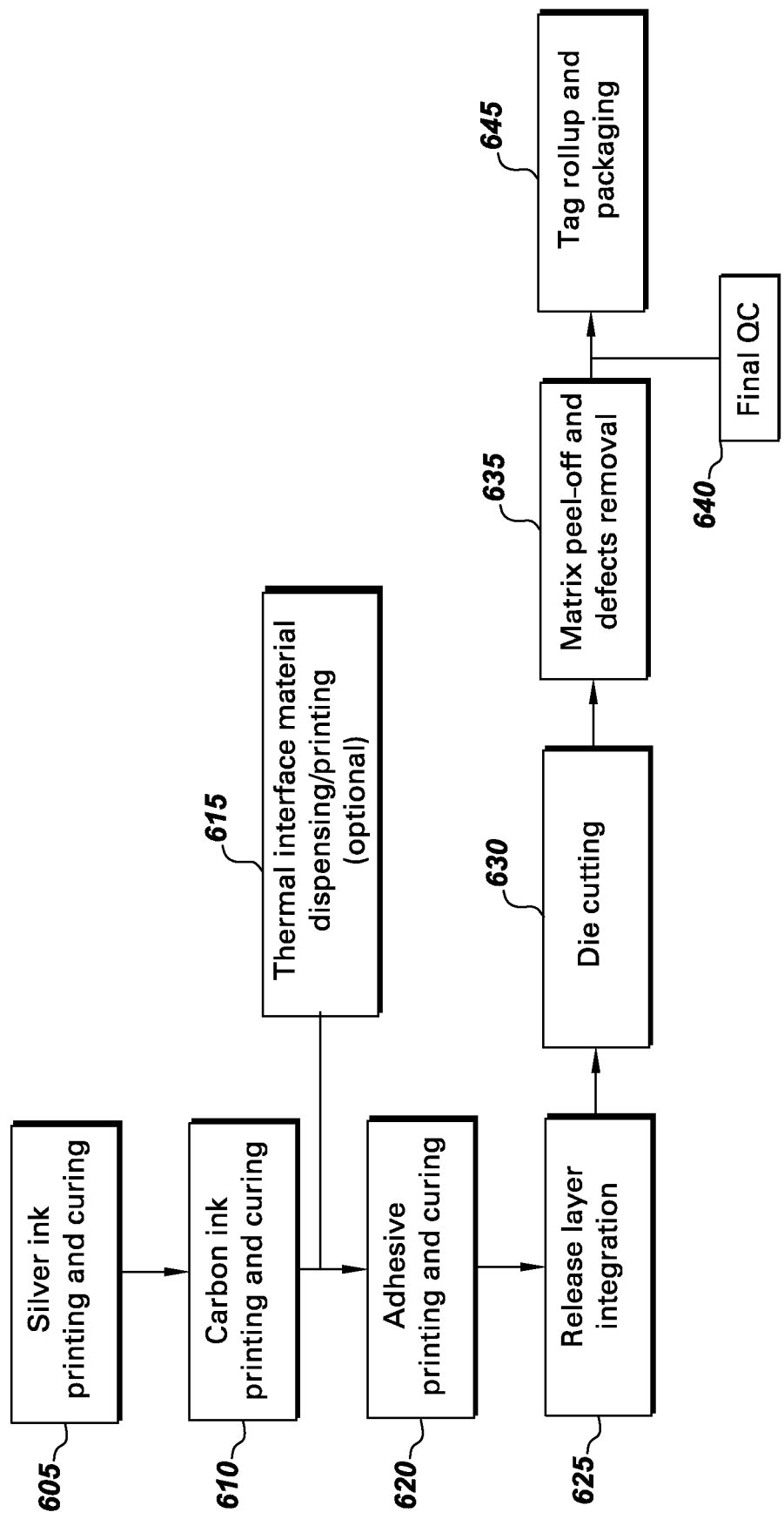
FIG. 6 is a block diagrammatic perspective of the processing of the tags.

One embodiment for manufacturing the tags is by label conversion. The label conversion in this example involves a number of steps including integration of release layers and the tag fabrication workflow is shown in FIG. 6. The basic label conversion processes is known to those skilled in the art and the following details the implementation with the tag processing.

The process commences with the procurement of the raw materials for silver ink printing and curing 605 with a second step of carbon ink printing and curing 610. An optional in-line inspection provides for some quality control to ensure that the layers for the printing and curing are satisfactory. There may also be a thermal interface material provided 615 such as by depositing or printing wherein the thermal interface material is used on or about the heater.

According to one embodiment, the conductors, heating elements, thermal interface and adhesives on the tag can be dispensed or deposited through a printing method such as screen printing, inkjet printing, rotary screen printing, flexographic printing, gravure printing or pad printing. In one particular example, an ink loaded with nanoparticles or a silver precursor is printed on the tag through a rotary screen printing process using a screen with a mesh count of 400 at a line speed of 5-10 meters/min. Subsequent to printing the coated sample is baked in an oven at 150° C. to cure the silver. In another example, a carbon ink from DuPont® is printed as the resistive heater using rotary screen printing using a screen with a mesh count of 200, in-between and overlapping with the silver traces. An example for the carbon ink is DuPont® 7102. The thermal interface material, for example the Liquibond® SA1000, is screen-printed using a 200-mesh screen and cured at 150° C. in an oven. The adhesive layer, Dymax Ultra Light-Weld® 3069 is printed with 200 mesh screen, followed by 30-45 seconds of UV curing.

There is an adhesive printing and curing 620 that provides the sectional adhesives to the tag. In this example there is a release layer integration 625 that is essentially the backing for the sticker followed by a die-cutting 630 that cuts the tag and matrix segment. There is a matrix peel-off to separate the matrix from the tag followed by a removal of any defects 635. An optional final quality control inspection may be done to ensure the tags are within the specified parameters. The manufacturing processing includes packaging that can include tag rollup 645.

The adhesives typically have stringent requirements for tack strength and shelf life. In addition, they generally should not leave any residue on the DVD upon removal of the tag. Examples of adhesives satisfying this criteria include UV curable adhesives, Actega Rad-Bond 15PSR7G, Dymax Ultra Light-Weld® 3069; hot melt adhesives, Henkel Primamelt® 37-625; thermally cured and dried adhesive, Dow Corning® 7358, 2013 and Clinghesive™ range of adhesives; and electrostatic bonding film, Gel-Film®.

In one embodiment, two release layers are included over the adhesive layers on the top and bottom surfaces of the tag. In another embodiment, a double sided release layer is used to cover both the top and bottom adhesive layers during the label conversion process. In yet another embodiment where there is no adhesive on the bottom side of the tag, a thin layer of silicone is coated on the bottom side of the tag. The tag can then be rolled onto itself similar to Scotch® tape.

The tag attachment process for integrating the tag with the media package also has a number of embodiments. In one process, the tag is obtained in the form of a roll with or without release layers. The tag is peeled off from the roll and first attached to the inside of an open media case. The disc is then placed over the tag at the right orientation. In one embodiment a vision system integrated with the pick and place robotics would align the media based on the barcode in the centerhub. The aligned media is placed at the center of the case and over the tag. A plunger-like mechanism would then "punch" the media over the tag. The adhesive on the top side of the tag would make the tag stick to the media and would stay in position in the configuration shown in prior Figures, even after the release of the plunger. In a variation of this embodiment, there is no adhesive on the bottom side of the tag. A drop or a spot of adhesive would be dispensed on the open media case at the right location and the tag would be placed over it. Preliminary experiments in the laboratory on the tag pickup process with the "punch" method indicate an alignment accuracy of 40 microns.

The typical media manufacturing involves media replication with the activation regions, printing of labels, and media packaging. Certain embodiments described herein involve implementing the point-of-sale activation components during the media manufacturing.

In another embodiment for tag attachment, the tag would be attached to the media first and then placed over the case. The tag is attached to the media in the right orientation, aligning the spot and heater. The media, along with the tag would then be placed on the open case.

The DVD case may require certain modifications to allow for the tag to protrude out of the case. Different embodiments of the package modifications are within the scope of the invention such as those recited in commonly assigned U.S. patent application Ser. No. 12/260,540, entitled Packaging For An Optical Article, which is incorporated by reference. In certain implementations, the case would require certain modifications to allow the tag to protrude from the case to allow the activation unit to electrically couple with the tag. For example, the tag can extend from the case and be wrap around the case to allow areas for external activation.

Subsequent to the tag attachment and placement of the media over the case, the media case is closed in an automated fashion. The tag that protrudes out of the media case would be crimped before the shrink-wrapping step. The shrink-wrap would finally secure the tag in place.

According to one embodiment, tags are produced using a subtractive method. In one example, embedded resistor material (such as Nickel-Phosphorous (NiP) alloy Ohmega-Ply® Conductor-Resistor Material, Ohmega Technologies, Inc.) is laminated to a dielectric film (Kapton, DuPont) and sequentially etched to produce conductive traces with resistors to be used as heaters. A etch resist is placed onto the material and is then patterned and developed. The pattern includes any location where the resistor-conductor material is located. The material is then etched, cleaned of the resist and repatterned for the resistor etch to selectively remove the conductor material. After etching the resist is cleaned from the surface.

Certain embodiment identify the various components that would be a part of the flexible tag, processes for depositing the layers, conversion of sheets of tags into rolls of labels that can be applied by standard label dispensers. Embodiments also describe various integration of the tag in the media package.

In further operational detail, the described system and techniques are intended to act as an anti-theft feature for the optical article to change the functionality of the optical media from a pre-activated state to an activated state. As used herein, the term pre-activated state of functionality refers to a state of functionality of the optical article where the material capable of undergoing a morphological transformation has not yet been exposed to one or more external stimulus. In the pre-activated state, at least a portion of the data on the optical data layer may not be readable in optimal form. The activated state of functionality of the optical article refers to the state where the optical article has been exposed to one or more external stimulus. In the activated state of functionality, the data in the optical data layer is readable. In other words, the optical article may be read without any noise or disturbances/errors, which may otherwise have been present in the pre-activated state.

The optical media typically includes at least one optical data layer for storing data, and in one example is configured to transform from a pre-activated state of functionality to an activated state of functionality, wherein the data is read from the optical data layer in an activated state of functionality. The optical media in one example includes a material disposed on the one or more optical data layers that is capable of undergoing a morphological transformation and alter from a inactivated state to an activated state. As used herein, the term disposed on embodies instances where the material capable of undergoing a morphological transformation may or may not be in direct contact with the optical data layer. In an exemplary embodiment, the material capable of undergoing a morphological transformation may be directly disposed on the optical data layer. In another embodiment, at least a portion of one or more layers (e.g., a capping layer) may be sandwiched between the material and the optical data layer such that the material capable of undergoing a morphological transformation is not in direct contact with the optical data layer.

One embodiment for altering the functionality of an optical media from a pre-activated state to an activated state includes having some portion of the optical media with a material capable of undergoing a morphological transformation by exposure to an external stimulus. As used herein, materials capable of undergoing a morphological transformation refers to a material or a combination of two or more materials that may transform from one state to another state. The transformation from one state to another may include a phase change or phase transformation, a phase separation, or a phase mixing. Further, both physical and chemical changes may be included in the transformation. Non-limiting examples of phase transformation may include transformations from crystalline to amorphous phases; transformations from ordered to disordered states; transformations from rubbery to glassy phases; transformations from immiscibility to miscibility of two or more materials; and transformations from immiscibility to miscibility of a material and a solvent. The term also includes the above-mentioned transformations in the reverse directions. For example, the transformations may include amorphous to crystalline transformations, or disordered to ordered state transformations. Phase separation implies the separation of a single-phase multicomponent material into constituent phases, where the multicomponent material may include two or more materials and may also include a solvent. The material capable of undergoing a morphological transformation in one embodiment is configured to irreversibly alter from the pre-activated state to the activated state.

When an optical article goes from the pre-activated state to the activated state, a measured optical parameter changes from its first optical value to a second optical value where the change in optical value results in a change in the error state of a sector or multitude of sectors on the optical article. The variety of optical signals includes those that affect the readout from the optical article. For example, if an attempt is made to read the data stored in the optical data layer of the article, the material capable of undergoing a morphological transformation may inhibit the same because of optical state change. The material capable of undergoing a morphological transformation may render the optical article partially or completely unreadable in the pre-activated state of functionality of the optical article. In the pre-activated state, the material capable of undergoing a morphological transformation may act as a read-inhibit layer by inhibiting the laser from reaching at least a portion of the optical data layer and reading the data on the optical data layer. For example, the material capable of undergoing a morphological transformation may absorb a major portion of the incident laser, thereby impeding it from reaching the optical data layer to read the data. Alternatively, the material capable of undergoing a morphological transformation may reflect the incident laser before the laser reaches the optical data layer. In this way, the material capable of undergoing a morphological transformation prevents the laser from reading the data in the optical data layer. Upon interaction with the external stimulus, the material capable of undergoing a morphological transformation allows the incident laser to pass through, and reach the optical data layer to read the data.

The optical state change may include one or more of reflection efficiency, single layer reflectivity, dual layer reflectivity, refractive index, birefringence, polarization, scattering, absorbance, transparency, and optical path length. The nature of these signals originates from the several intrinsic light parameters that affect the signal measured by the detector assembly of the optical disc reader. These intrinsic light parameters include light intensity, directionality, polarization, and phase. The change in optical properties of the optical article upon exposure to an external stimulus, e.g., from the activation system, can appear in any manner that results in the optical data reader system receiving a substantial change in the amount of energy detected. In certain embodiments, the first morphology of the material capable of undergoing a morphological transformation is characterized by the first transparency, and the second morphology of the material capable of undergoing a morphological transformation is characterized by the second transparency, which is higher than the first transparency. In an exemplary embodiment, the second transparency is greater than about 30 percent. In this embodiment, the material capable of undergoing a morphological transformation may be disposed on a majority of the available area of the optical article. In another exemplary embodiment, the optical change in the material capable of undergoing a morphological transformation in the pre-activated state and the activated state of the optical article results in an optical reflectivity change of the optical article to at least about 10 percent. In this embodiment, the material capable of undergoing a morphological transformation may be disposed in a discrete area or may be patterned on the optical article.

In one example, the mask layer is optically opaque in the first state, and is optically transparent in the second state. According to one example, the chemical ingredients include a dye that absorbs light in the visible light and/or optical reader spectrum, and a further chemical that is activatable to shift the dye's absorption wavelength so the data layer can be read by the optical reader. The activation source is radiative emission having a wavelength different from that of visible light and/or the optical reader. The activation source can be used at the point of sale of the device to render the device readable upon purchase.

The external stimulus may include a laser, infrared radiation, thermal energy, infrared rays, X-rays, gamma rays, microwaves, visible light, ultra violet light, ultrasound waves, radio frequency waves, microwaves, electrical energy, chemical energy, magnetic energy, mechanical energy, or combinations thereof. The interaction with the material capable of undergoing a morphological transformation may include continuous, discontinuous, or pulsed forms of the external stimulus. The external stimulus may be selected based on the type of material capable of undergoing a morphological transformation. For example, when the material capable of undergoing a morphological transformation includes a polymer blend, the external stimulus may be an electromagnetic radiation source of appropriate wavelength and power to make the polymer blend transparent to the laser, thereby changing the functionality of the optical article from an unreadable state to a readable state. In an exemplary embodiment, the material capable of undergoing a morphological transformation may include organic or inorganic additives. These additives may absorb the external stimulus, such as infrared radiation. In an exemplary embodiment, this absorption of the external stimulus by the additives may result in temperature change of the additives. This temperature change may cause local heating in the material capable of undergoing a morphological transformation, thereby making the material capable of undergoing a morphological transformation transparent to the incident laser.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An activation system for optical media packaged in a case, comprising:
    a tag;
    at least one pair of conductors on said tag; and
    at least one heating element coupled to said at least one pair of conductors;
    wherein said at least one heating element is oriented proximate one or more activation regions on said optical media, and wherein said at least one heating element is configured to provide sufficient heat to alter said one or more activation regions such that said optical media becomes activated; and
    a fuse integrated with said tag and coupled to one or more of said at least one pair of conductors, wherein said fuse is configured to be blown to prevent further heating by said at least one heating element after said at least one heating element provides a level of heat within a desired range.

2. The system according to claim 1, further comprising a power source that electrically couples with said at least one pair of conductors prior to said activation.

3. The system according to claim 2, wherein said power source is a point of sale activation unit.

4. The system according to claim 1, wherein the tag is attached to said optical media and then packaged in said case.

5. The system according to claim 1, wherein said tag is attached to said case and the optical media is then placed in said case.

6. The system according to claim 1, wherein said tag comprises a pedestal that is coupled to said case.

7. The system according to claim 1, wherein said case further comprises case structures.

8. An activation tag for a media article, comprising:
    a tag material;
    at least one pair of conductive traces disposed on said tag material;
    at least one heating element disposed on said tag material and electrically coupled to said at least one pair of conductive traces;
    wherein said at least one heating element is configured to be disposed proximate one or more activation regions on the media article and configured such that, during activation of the at least one heating element, the one or more activation regions become altered by heat from the at least one heating element and the media article is activated; and
    a fuse integrated with said tag material and coupled to one or more of said at least one pair of conductive traces, wherein said fuse is configured to be blown to prevent further heating by said at least one heating element after said at least one heating element provides a level of heat within a desired range.

9. The tag according to claim 8, further comprising a thermal interface material disposed between said at least one heating element and said one or more activation regions.

10. The tag according to claim 8, wherein said at least one heating element comprises a section of carbon ink, or a section of nickel ink.

11. The tag according to claim 8, wherein said tag material is at least one of Polyethylene Terephthalate (PET), Polyimide, and paper.

12. The tag according to claim 8, wherein said tag material includes an angled portion.

13. The tag according to claim 8, wherein said tag material has at least one adhesive section proximate said at least one heating element.

14. The tag according to claim 8, wherein said tag material has a top surface and a lower surface with said media articles oriented facing said top surface and further comprising at least one adhesive section on said lower surface.

15. A method of fabricating an activation tag for media articles, comprising:
    forming a substrate;
    providing at least one pair of conductive traces on said substrate;
    providing at least one heating element on said substrate;
    providing a fuse on the substrate, the fuse coupled to one or more of said at least one pair of conductive traces, wherein said fuse is configured to be blown to prevent further heating by said at least one heating element after said at least one heating element provides a level of heat within a desired range;
    disposing an adhesive on at least a portion of the substrate, the adhesive configured to couple the substrate proximate one or more activation regions on a media article such that heat from the at least one heating element can alter the activation regions to activate the media article;
    cutting said substrate; and
    removing a matrix portion defining the activation tag.

16. The method according to claim 15, further comprising providing a thermal interface material on the heating element.

17. The method according to claim 15, wherein said substrate has a top surface and a lower surface and wherein said adhesive is on at least one of said top surface and said lower surface.

18. The method according to claim 17, further comprising having a release layer covering said adhesive on at least one of said top surface and said lower surface.

19. The method according to claim 15, wherein said substrate has a top surface and a lower surface and further comprising a silicone coating on said lower surface.

20. The method according to claim 15, further comprising forming a roll of said activation tag.

* * * * *